United States Patent [19]

Levitan

[11] Patent Number: 5,864,823
[45] Date of Patent: Jan. 26, 1999

[54] INTEGRATED VIRTUAL TELECOMMUNICATION SYSTEM FOR E-COMMERCE

[75] Inventor: Gutman Levitan, Stamford, Conn.

[73] Assignee: Virtel Corporation, Stamford, Conn.

[21] Appl. No.: 881,934

[22] Filed: Jun. 25, 1997

[51] Int. Cl.[6] .................................................. G06F 15/21
[52] U.S. Cl. .............................. 105/14; 105/26; 105/27
[58] Field of Search .................................. 705/14, 26, 27

[56] References Cited

U.S. PATENT DOCUMENTS

| | | | |
|---|---|---|---|
| 5,305,195 | 4/1994 | Murphy | 364/401 |
| 5,515,098 | 5/1996 | Carles | 348/8 |
| 5,532,735 | 7/1996 | Blahut et al. | 348/13 |
| 5,703,795 | 12/1997 | Mankovitz | 345/327 |
| 5,710,887 | 1/1998 | Chelliah et al. | 705/26 |
| 5,715,400 | 2/1998 | Reimer et al. | 705/26 |
| 5,809,144 | 9/1998 | Sirbu et al. | 705/26 |

*Primary Examiner*—Allen R. MacDonald
*Assistant Examiner*—Penny Caudle
*Attorney, Agent, or Firm*—Ilya Zborovsky

[57] ABSTRACT

A system for distribution of advertisements to interested recipients only via one-way nonaddressable television media and for transmission of orders from recipients to advertisers via two-way addressable Internet media. A system for electronic delivery of newspapers, magazines, books, music, video and computer software to authorized recipients only via nonaddressable television media with recipients' authorization via addressable Internet media. As a result, usage of slow and overcrowded Internet in e-commerce is limited to relatively low-volume communications that need to be addressable while all high-volume information is transferred through fast one-way television lines to bypass the Internet and reach simultaneously an unlimited number of recipients.

7 Claims, 5 Drawing Sheets

INTEGRATED VIRTUAL TELECOMMUNICATION SYSTEM FOR E-COMMERCE

BACKGROUND OF THE INVENTION

The present invention relates to information technology for television and Internet based electronic commerce.

U.S. Pat. No. 5,532,735 describes a technique for interactive television (video-on-demand) system wherein viewers are allowed to select a desired amount of advertisements and accordingly receive a discount for ordered entertainment programs: no discount with no advertisements, some discount with moderate amount of advertisements and biggest discount with a lot of advertisements. PointCast Inc., Cupertino Calif., has developed a screen saver application (a program that takes over control of the screen when computer idles) that delivers news headlines and commercials from Web sites to on-line computer users. U.S. Pat. No. 5,305,195 discloses a system for providing advertising information for on-line PC users during waiting time in on-line activities. U.S. Pat. No. 5,276,866 describes an information retrieval system based on two different communication mediums: an automated touch tone telephone service and interactive video. U.S. Pat. No. 5,481,542 discloses a system which uses a set-top cable box associated with a customer's television set for interactive services: movie-on-demand, shop at home and others.

U.S. Pat. No. 5,515,098 describes a system for distributing commercials to individually addressable subscriber terminal on a network. Commercial messages to be distributed over the network contain embedded information identifying categories of recipients for each message. A server, located on the network, provides each commercial with addresses of terminals to which the commercial is to be distributed. The addresses are selected by the server based on demographic and other information related to the households of subscribers. The commercial is received by an addressable set-top box and displayed on TV screen.

The common feature of referred above prior art is advertising via addressable media. Thus cited U.S. Pat. No. 5,515,098 discloses, in fact, an electronic version of a technique widely used in direct mail promotion. Meanwhile nonaddressable one-way broadcast and two-way addressable service are different and equally important parts of any communication infrastructure. On one side we see newspapers, radio and television, on other—mail, telephone and video conferencing. This two types of communications are fundamentally different not as much in technology as in domain. While nonaddressable broadcast media dominates in delivery of news, entertainment and advertisement, two-way addressable media supports personal communications and teletransactions. One watches a commercial on TV and then places an order by phone, not the other way around. Fortunately, advertising by mail and phone is typically unsuccessful, otherwise we would have a problem looking for bills lost in a pile of junk mail, and phone wouldn't give us a break. The more advanced technology is used for addressable advertising the more annoying the advertising is. That is why the Internet community hates junk e-mail. Switching media domains, whatever innovative it seems to be in theory, looks pretty much as media misuse and abuse in practice.

U.S. Pat. No. 5,534,911 by the same applicant describes an apparatus for providing a customer of a television system with virtual personal channel that being selected delivers television programs of the most personal interest no matter on which channel and at what time the programs are physically transmitted. In this application, the technology of virtual personal channel is further developed to provide a new type of television advertising referred herein as commercial-on-demand, which, in turn, is incorporated with the Internet to facilitate a highly automated home shopping system referred herein as virtual personal store.

Commercial-on-demand (COD) is a civilized alternative of annoying junk mail and solicitation by phone. Advertising a a product, COD goes only to those recipients, TV viewers and PC users, who currently indicate an interest in that kind of product, and does not bother all others. Unlike junk e-mail, COD does not clog the Internet bypassing it via nonaddressable broadcast TV cannels—cable, satellite and so on. Having power of multimedia presentation COD is affordable because it doesn't need to be inserted in a prime-time popular program: computers automatically pick it up from any channel at any transmission time. Just compare: one-page advertisement in a popular magazine may cost $100,000 and even more; one TV channel can transfer 100,000 pages per hour, 2.5 million pages per day.

Connected to both a TV system and the Internet, recipient's computer, which is a PC or a computer built in a set-top cable box, facilitates home shopping via a system reffered herein as virtual personal store (VPS). VPS exposes products and services of the most personal interest because all of them are brought by CODs. If recipient decides to place an order, the computer automatically composes the order and sends it through the Internet thereby providing shopping in easy "point, click and have it" manner. Unlike advertising, placing orders via telephone or the Internet does not bother anybody—advertisers gladly accept them.

Ordered products are physically delivered by U.S. mail or UPS, or other similar service. Products of informational rather than physical nature, such as newspapers, magazines, books, music, video and computer software, can be delivered virtually (electronically) via Internet. In fact, the Internet becomes a major medium for software distribution. However newspapers' delivery would clog the addressable network because of a large amount of digital information distributed simultaneously to a large number of recipients. This application discloses an electronic products' distribution to authorized recipients via television lines using the Internet for authorization only. The system for virtual products' delivery is different from and more efficient than "pay-per-view" system currently used in entertainment television. Digital info products are not supposed to be viewed, listened or read when delivered, so they are transmitted as fast as possible. Moreover, the transmission itself can happen at any time including late night, early morning and work hours, not only at expensive "prime time" convenient for viewers. Recipient's computer automatically picks up a product from any channel at any time as determined by time/channel data included in authorization message for that product. One TV channel during 1.5 hour can transmit one pay-per-view movie or 500 different titles of books. And because there are only 4 hours a day for efficient sale of pay-per-view movies and all 24 hours for virtual delivery, the ratio is really not 1:500 but 1:3000.

A number of systems and products providing TV viewers with Internet services have been recently announced. Philips Electronics and Sony Corp. are marketing WebTV set-top box based on technology developed by WebTV Network Inc., Palo Alto, Calif. Mitsubishi Electric and Sharp Electronics announced Internet TV based on Net Front software from Access Co, Tokyo. Zenith Electronics Corp., Glenview, Ill., presents Net Vision system based on an appliance from Diba Inc., Menlo Park, Calif. While those technologies are very important for implementation of current invention, functionally they are different: they provide TV viewers with well known Internet services such as e-mail, browsing Web sites and so on, but not with commercial-on-demand, virtual personal store and virtual delivery. Moreover, those systems make no use of one-way nonaddressable television lines, they are using only TV set screen as a computer monitor.

SUMMARY OF THE INVENTION

Accordingly, it is an object of the present invention to provide a system for delivery of commercials and other advertising information to interested recipients only. Each commercial-on-demand comprises two separate parts: a multimedia presentation of a merchandise intended for human attention, and a preliminary message about the presentation intended for computer processing. Both parts are loaded in a multimedia database associated with the television system center or headend and when a presentation is scheduled for transmission the corresponding message is supplemented with time/channel data of the transmission and transmitted prior to the presentation. At the recipient's site, each preliminary message is processed by computer that stores recipient's profile data, and if the profile indicates an interest, the corresponding advertisement is selected and its presentation is recorded at the time of transmission.

Another object is to provide an automated home shopping system, virtual personal store, that combines nonaddressable television broadcast of comercial-on-demand with addressable Internet e-mail service. The system presents to recipient products and services of the most personal interest because all presentations are delivered by commercial-on-demand. At recipient's request, the system automatically composes an order using recipients's name and address included in recipient's data and advertiser's e-mail address brought by commercial, and sends the order through the Internet to advertiser.

A further object of the invention is to provide a home shopping system that uses advertiser's Web address brought by recorded commercial to automatically link recipient's computer to advertiser's Web site which is, in fact, advertiser's virtual store, so that recipient interested in a commercial can browse and make orders for products of the advertiser not included in the commercial explicitly. That is important for supermarkets, department stores and many other businesses which sell a large number of different products and never advertise all of them.

A still further object of the invention is to provide PC users with all described above services using an intermmediate Internet server connected to a television system so that PCs themselves do not need to be connected to television. Such an implementation however doesn't provide privacy of profiles and could be slow.

A one more object of the invention is to provide fast local and global virtual delivery of newspapers, magazines, books, music, video and computer software to authorized recipients via one-way nonaddressable television media using addressable two-way Internet for orders, authorizations and bills. As a result, usage of slow and overcrowded Internet in e-commerce is limited to relatively low-volume communications that need to be addressable while all high-volume transmission of info products and advertisements goes through fast one-way lines in order to bypass the Internet and reach simultaneously an unlimited number of recipients.

BRIEF DESCRIPTION OF THE DRAWING FIGURES

DESCRIPTION OF THE PREFERRED EMBODIMENTS

Figure 1:
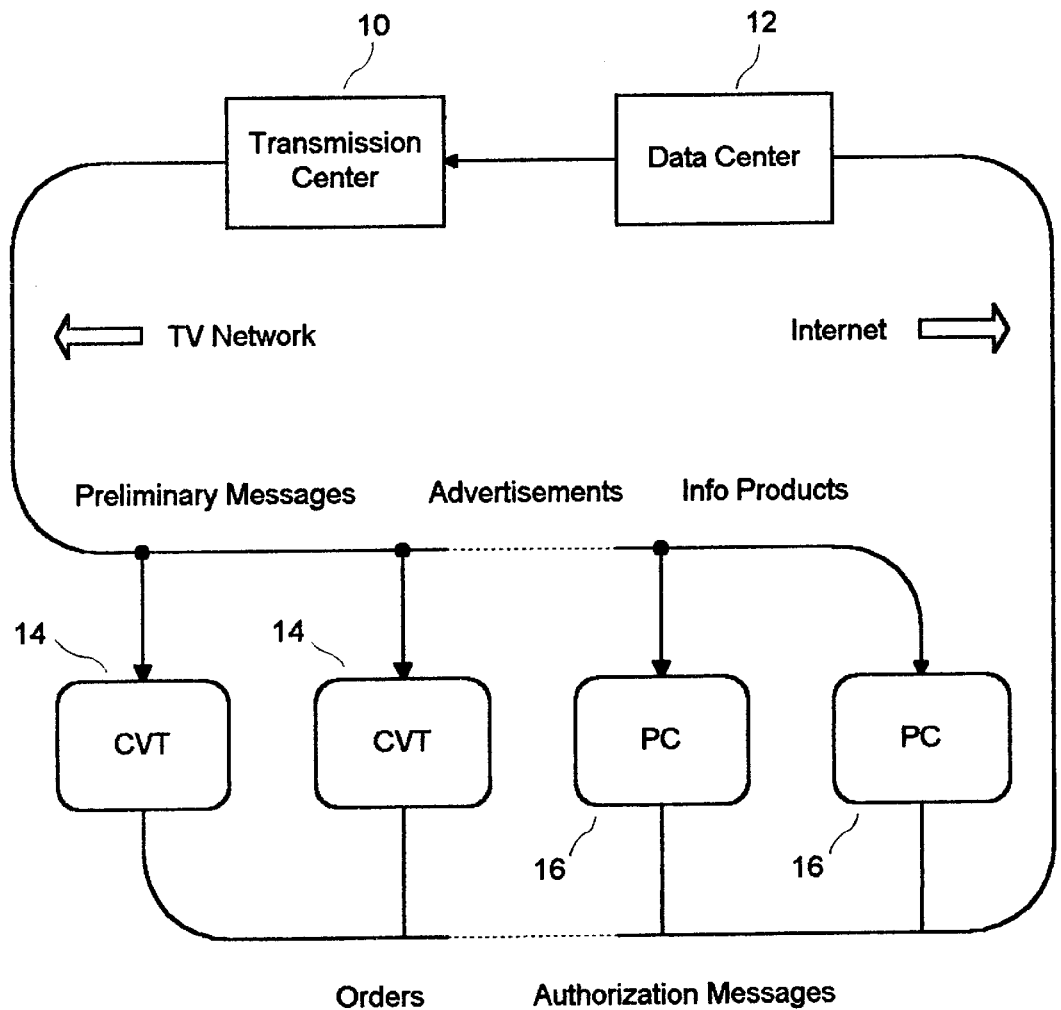
FIG. 1 is a block diagram of an integrated telecommunication system for e-commerce.

A block diagram of an integrated telecommunication system for e-commerce is shown on FIG. 1. A distribution center consists of a television system transmitting center (headend) 10 and associated with the headend a data processing center 12 where advertisements are prepared for transmission and stored in a multimedia database. The data processing center can be a part of headend or an outside so called signal origination site connected to headend via satellite, microwave relay lines or the Internet. Each commercial-on-demand (COD) consists of at least two parts: a presentation of a product intended for human attention and a formatted record intended for computer processing. Advertisers send presentations to the data center 12 by mail or via the Internet. Formatted records are prepared by advertisers themselves or by customer service personnel at the center 12. All records are entered in a database by filling on-line forms based on supply data models different for various types of trade. For example, a real estate form prompts for such information as kind of property, location, price and so on. When an advertisement is scheduled for transmission its record is retrieved from the database, supplemented with access data specifying time and channel of the transmission, and included in a preliminary message to be sent prior to the advertisement itself. Preliminary messages are transmitted on a certain channel at a certain time so that computerized video terminals 14 and personal computers 16 could receive and process all messages about all advertisements scheduled for transmission. Recipients never see the messages, they are intended for high-speed high-volume automatic processing by recipients' computers. The messages contain limited amount of raw data, no graphics or video.

Each recipient's computer compares all preliminary messages with recipient's profile data so that each advertisement would be selected or rejected before it is transmitted. After selection has been made, selected advertisements can be picked up from any channel at any transmission time. In other words, recipient's computer deals with all preliminary messages but only with selected advertisements. As a result, advertisements can carry much more digital information than their messages. Recipient's profile is based on a demand data model different for various types of trade. Supply and demand data models for the same trade are designed together to provide perfect match. Profile data are collected by presenting relevant questions with multiple-choice answers to recipient, and processing recipient's responses made in "point and click" manner.

There are three reasons for distribution of advertisements via nonaddressable television media bypassing the Internet. The first one is bandwidth: a cable line is almost 1000 times faster than a telephone line (27 Mb/s vs 28.8 kb/s). Another reason is ethical: no annoying junk e-mail, you see a COD only if your profile indicates an interest in it. Most Internet service providers will deny access if there are significant abuses to the Internet policy of not permitting unsolicited commercial messages. The third, and the most important reason however is the number of recipients served simultaneously. In any addressable system, is it telephone, the Internet or interactive television, each recipient needs a separate channel for the time of communication, and therefore only limited number of recipients can be reached simultaneously. In a nonaddressable broadcast system all recipients are connected (tuned) to the same channel and thus there is no technical limit for the number of recipients. This fundamental difference between addressable and nonaddressable media will always exist and neither digital compression nor cable modem for Internet connection can eliminate it.

Figure 2:
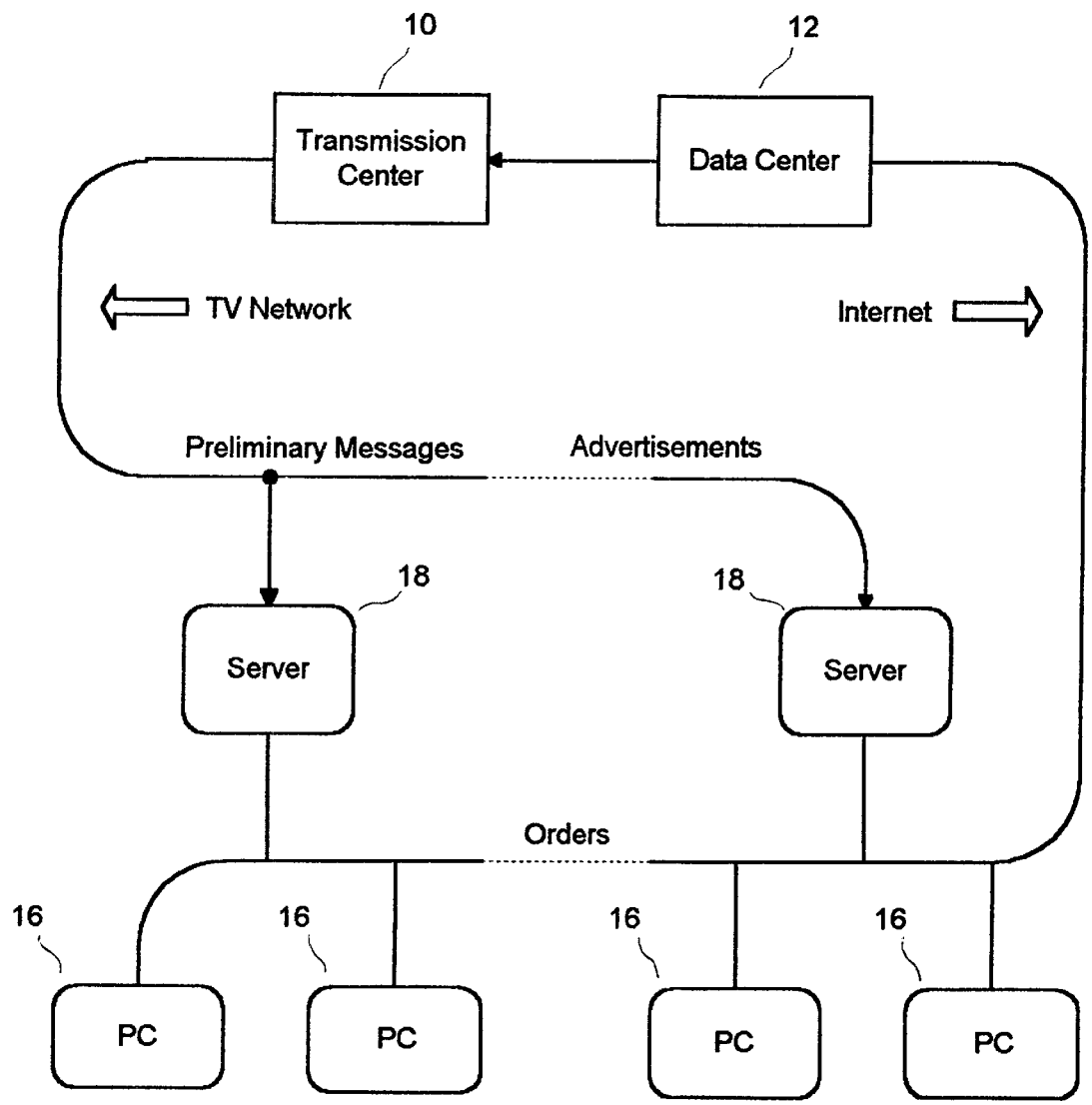
FIG. 2 is a block diagram of an integrated telecommunication system for e-commerce with intermmediate servers.

FIG. 2 shows an integrated telecommunication system for e-commerce with intermmediate Internet servers 18 connected to a television system so that recipients' computers wouldn't need to be connected to television. The system provides COD and virtual personal store (VPS) for those recipients who are not pay TV subscribers or whose pay TV provider doesn't offer COD option. A server computer stores profile data of a group of recipients determining individual interests of each recipient in certain products and services. The server computer is connected via an appropriate interface, such as a cable modem, to a television one-way nonaddressable medium for reception of preliminary messages about all scheduled advertisements. It compares data included in preliminary messages with recipients' data and selects each advertisement whose content matches interests of at least one recipient, assigns the advertisement to all interested recipients and stores access data off all selected advertisements, including transmission time and channel. Then server computer provides reception and recording of each selected advertisement at the time of its transmission. Recipients connected to the server via the Internet can view assigned to them CODs and make orders. Such an implementation however doesn't provide complete privacy of profiles and could be slow.

Figure 3:
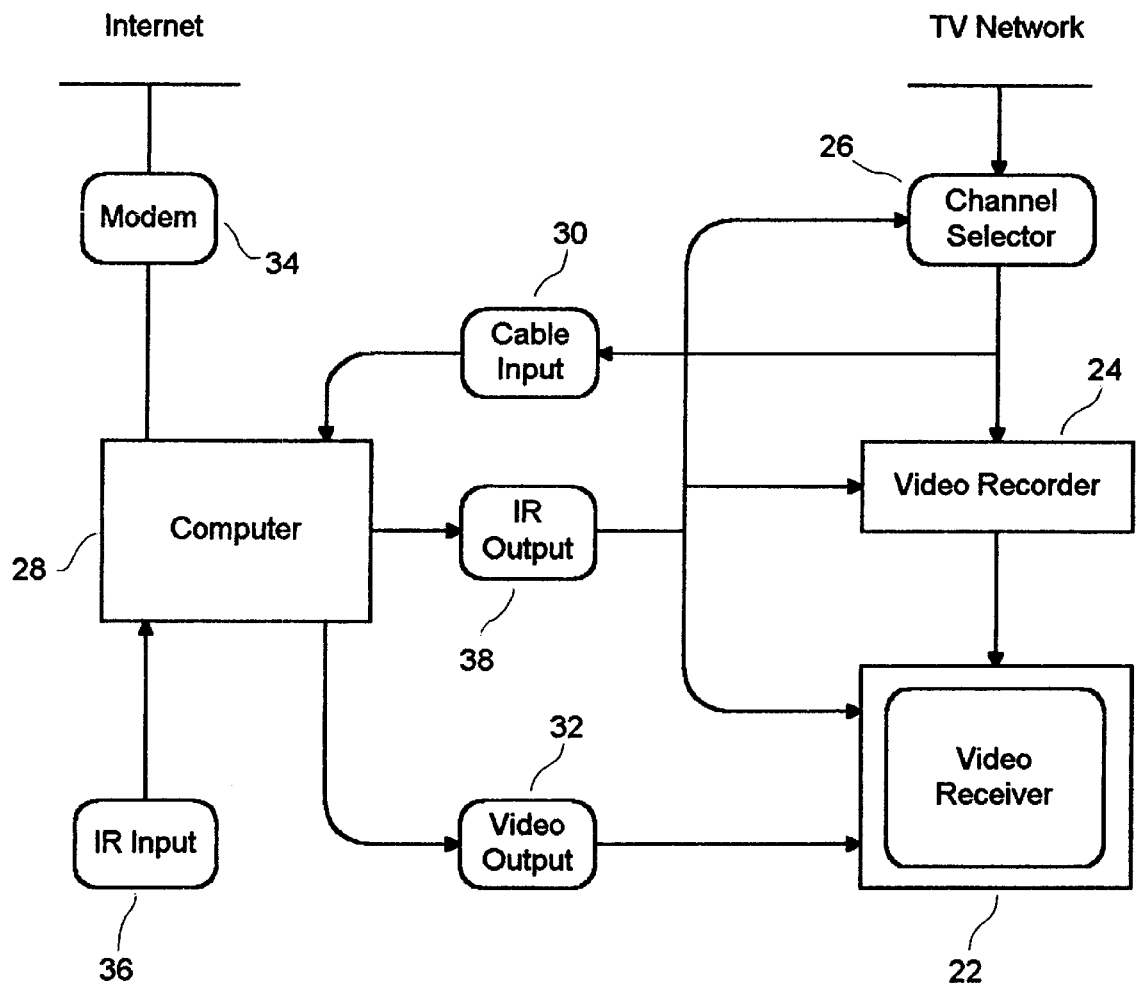
FIG. 3 is a block diagram of recipient terminal.

A block diagram of a computerized video terminal (CVT) 14 is shown on FIG. 3. It includes a video receiver (TV set) 22, a video recorder 24 and a channel selector (tuner) 26. A computer 28 is connected via a cable interface 30 to a television network and via a standard modem 34 to a telephone line. The computer does not have a screen and a keyboard—the most space-consuming parts of a laptop-size computer. It outputs video signal via interface 32 to the screen of television set 22. The computer receives recipient's input via infrared interface 36 and controls TV set 22, VCR 24 and channel selector 26 via infrared output 38.

A number of systems and products providing TV viewers with Internet services have been recently announced. Philips Electronics and Sony Corp. are marketing WebTV set-top box based on technology developed by WebTV Network Inc., Palo Alto, Calif. Mitsubishi Electric and Sharp Electronics announced Internet TV based on Net Front software from Access Co, Tokyo. Zenith Electronics Corp., Glenview, Ill., presents Net Vision system based on an appliance from Diba Inc., Menlo Park, Calif. Those systems don't facilitate COD and VPS, and in fact, make no use of one-way nonaddressable television media communicating via the Internet only. In other words, they are only using TV set screen as a computer monitor but are not integrated with television systems. At the same time, they provide some hardware and software decisions important for implementation of the CVT shown on FIG. 3. One of the implementation problems is minimizing flicker in computer output on TV screen. The flicker results from different scanning techniques: interlaced scanning in television and progressive scanning for computer monitors. The cited above systems have resolved the problem and feature sharp focus and finely detailed images for computer output. Another problem is interaction of recipient with computer that should be simpler and faster for TV viewer which is not a PC user. In WebTV system, recipient's input is provided via hand-held remote in a "point and click" manner. Typing is avoided by using multiple choice and directories. When a low-volume alphanumeric input is necessary, a key board are displayed on the screen so that individual characters could be selected and entered by pointing and clicking. WebTV box does not require a dedicated phone line: it plugs into a standard line via a line splitter so that viewer could receive incomming calls while browsing Web.

While Internet-TV systems are interactive computer systems providing recipient's input for computer, Internet connection and computer output on TV screen, the CVT of FIG. 3 is both interactive and real-time control system. It is driven by a clock/calendar implemented in computer 28 to receive a flow of preliminary messages at a certain time from a certain channel, both defined by a permanent schedule, and then to receive and record each selected advertisement at the time of its scheduled transmission as determined by access data included in corresponding preliminary message. At a proper time the computer 28 switches the channel selector 26 to a proper channel in order to receive preliminary messages or a selected advertisement. Access data determine transmission time, channel and an identification number of the advertisement so that the advertisement could be picked up by its ID in a specified time zone.

Unlike an expensive cable modem for the Internet, the cable interface 30 transfers only nonaddressable "downstream" and therefore no limits are imposed on the number of recipients served simultaneously from a neighbourhood cable node. All existing TV sets, VCRs and channel selectors (cable boxes) have infrared interfaces for remote control in order to turn power on and off, switch channels, adjust volume, start and stop recording, rewind and play back a tape. The computer 28 can perform all those operations with the infrared output interface 38 thereby providing automatic control without any change to existing TV sets, VCRs and channel selectors. Some new TV sets however have built in computers and do not require an infrared connection. As to video recorder 24, the conventional VCR can be replaced soon by a digital video disk (DVD) drive. A new remote control device based on touch-sensitive "smart" paper might supplant infrared remote controller 36.

Note that implementation of commercial-on-demand (COD) does not require Internet connection: it is a nonaddressable service. Recipient can order products and services by mail or by phone and he has to if advertiser doesn't have an e-mail address. However Internet connection facilitates an automated COD-based shopping system—virtual personal store (VPS). It is virtual because it stores psesentation of merchandise rather than merchandise itself. It is personal because it exposes items brought by commercial-ondemand, which means, only those products and services that match recipient's interests. And it is a store because recipient can select and buy whatever he wants without filling forms or making phone calls.

Figure 4:
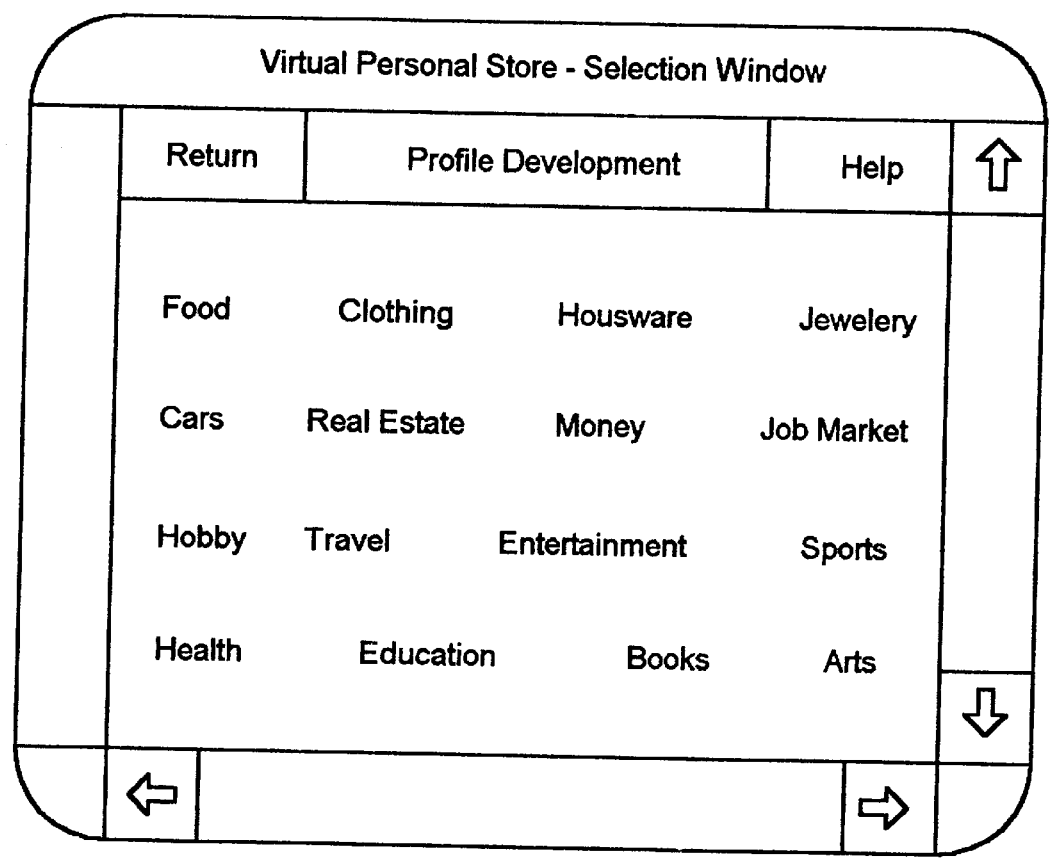
FIG. 4 shows the first selection window of virtual personal store.

Selected advertisements are sorted by type of merchandise and stored in corresponding departments of VPS. FIG. 4 shows the VPS first selection window. It has a title bar on the top with the name of the window, a menu bar next, a scroll bar on the right and names of departments that can be entered from the window. Pointing and clicking recipient can select and open any department or scroll the window up and down looking for other departments. A department is empty until its profile is set: no profile means no interest. To set a profile for a particular department recipient opens the department and selects Profile Development from the menu bar. In profile development session computer presents questions appropriate for that department. For example, if it is CARS department the questions are those you hear from a car dealer when you enter his shop. Each question has a multiple choice of answers. Recipient selects answers, computer processes his responses and sets profile. If recipient has a problem with a question he can select Help from the menu bar. As soon as a profile for a department is set all advertisements that match the profile will be selected, recorded and stared in that department database.

Figure 5:
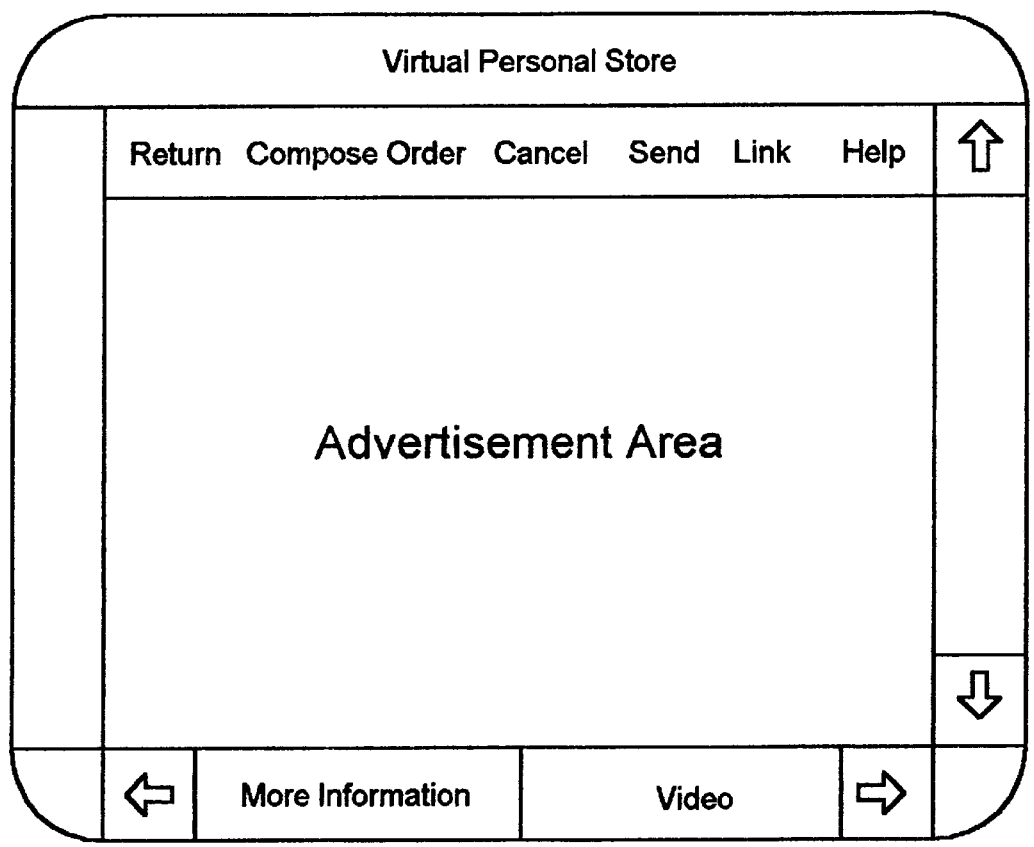
FIG. 5 shows a layout of a window for viewing and ordering products in virtual personal store.

A presentation part of commercial-on-demand (COD) may be just a text like in yellow pages or classified section of a newspaper, or a picture with a text like in a catalog, or a video clip, i.e. a conventional TV commercial. It may also combine different forms of presentation. The most sophisticated form is applet—a computer program written in JAVA language. An applet can provide a dialog with recipient, an animation, a 3-dimensional picture. Recorded CODs are stored in appropriate departments of VPS where they can be viewed and from where the advertised products and services can be ordered. FIG. 5 shows a layout of VPS window for viewing and ordering advertised products and services. A presentation of a product, typically a picture and a text, occupies the advertisement area. Recipient can click on "More information" to get details, or on "Video" to watch a video clip about advertised product. If recipient decides to buy the product he clicks on "Compose order". The e-mail order will appear on the screen overlaying the advertisement. The computer has all necessary information to make it: product data and advertiser e-mail address brought by COD, and recipient's name and mailing address stored in recipient's profile. Questions with a choice of answers about size, color and so on may appear on the screen before the order is completed. Recipient can send or cancel the order just with a click on corresponding action in the menu bar. If the advertiser has a Web site and supplies its address the action "Link" transfers recipient to the site, which is, in fact, advertiser's virtual store, so that recipient interested in a commercial can browse and make automatically composed orders for products of the advertiser not included in the commercial explicitly.

Unlike commercials, orders sent via the Internet do not create any problem. First, advertisers want them. Second, only a small percentage of targeted audience responds with orders. Third, e-mail order contains less digital information than commercial: less text, no graphics, no video.

Products ordered in VPS are delivered by U.S. mail or UPS, or other similar service. Products of informational rather than physical nature, such as newspapers, magazines, books, music, video and computer software can be delivered virtually, that is via communication lines. In fact, the Internet becomes a major medium for software distribution. However delivery of newspapers would flood the addressable network by large flow of digital information distributed simultaneously to many recipients. In the integrated communication system of FIG. 1, info products in a large demand are distributed locally and globally via nonaddressable television lines bypassing the Internet, while Internet transfers only orders, authorizations, bills and payments for those products. For reception of an info product the recipient's terminal needs two things: an appropriate recording media and authorization. As to media, for newspapers, magazines and books it could be an ordinary diskette with its 1.44 MB of storage. Audio products can be recorded on a rewritable compact disk, CD-RW, having 650 MB. For movies and other high-volume digital video products the terminal needs a drive for erasable DVD featuring 4.7 GB of storage.

A vendor or a distributor sends a copy of a product and a list of recipients via mail or the Internet to the data center 12 (FIG. 1). There the product is scheduled for transmission as a digital file from the television network center 10. Prior to the transmission an authorization message is sent via e-mail to recipients included in the distribution list. The message specifies access data: time and channel of the transmission and an identification number of the digital file carrying the product. At recipient's site the computer 28 (FIG. 3) receives the authorization message via modem 34 and uses access data to control the channel selector 26 and a drive of an appropriate recording medium in order to provide reception and recording of the digital file carrying the product at the time of its transmission via nonaddressable television network.

In order to prevent unauthorized reception, the broadcast transmission of digital files carying info products needs to be protected. The common security method is encryption. The file can be encrypted with a key, and the key has to be included in the authorization message along with other access data. Another key-based protection technique is disclosed in U.S. Pat. No. 5,280,497 by the same applicant. It describes acces control by frequent pseudorandom redistribution of different transmissions among different physical channels. In this case encryption of files is not necessary because the transmission system itself takes care about protection. A combination of these methods provides a security deadlock because none of those two protections can be defeated before the other. While certain novel features of this invention have been shown and described and are pointed out in the annexed claims, it will be understood that various omissions, substitutions and changes in the forms and details of the devices illustrated and their operation can be made by those skilled in the art without departing from the spirit of the invention.

I claim:

1. A system for distribution of advertisements to interested recipients only, comprising:

a one-way nonaddressable communication medium;

a transmitter at a distribution center connected to said one-way nonaddressable communication medium for transmission of advertisements presenting various products and services;

a transmitter at said distribution center connected to said one-way nonaddressable communication medium for transmission of preliminary messages about said advertisements scheduled for transmission, each message specifying content of an advertisement and its access data including a time of transmission;

a receiver of said preliminary messages at a recipient's site coupled to said one-way nonaddressable communication medium in such a way as to receive said preliminary messages about said advertisements scheduled for transmission;

selection means storing recipient's data determining recipient's interests in certain products and services, said selection means coupled to said receiver of preliminary messages for comparing said recipient's data with data included in said preliminary messages, selecting those advertisements whose content matches the recipient's interests, and storing access data of said selected advertisements;

a receiver of said advertisements coupled at said recipient's site to said one-way nonaddressable communication medium;

a recoder connected to said receiver of advertisements;

control means coupled to said selection means for obtaining said access data of said selected advertisements, and coupled to said receiver of said advertisements and said recorder for providing reception and recording of each selected advertisement at the time of its transmission as determined by said access data; and means for presentation of advertisements coupled to said recorder for presenting recorded advertisements to recipient at a recepient's request.

2. A system of claim 1; and further comprising a connection to a network for two-way addressable data communication and enabling, at a receipient's request, to automatically compose orders for products and services presented by said selected advertisements using a recipient's name and address included in recipient's data, and send the orders via said network using advertisers' network addresses included in data of advertisements.

3. A system of claim 1; and further comprising a connection to a network for two-way addressable data communication and enabling, at a receipient's request, to automatically link a recipient to advertisers' network sites using advertisers' network addresses included in data of advertisements, and to automatically compose orders for products and services presented at those sites using a recipient's name and address included in recipient's data.

4. A system for distribution of advertisements to interested recipients only, comprising:

a one-way nonaddressable communication medium;

a transmitter at a distribution center connected to said one-way nonaddressable communication medium for transmission of advertisements presenting various products and services;

a transmitter at said distribution center connected to said one-way nonaddressable communication medium for transmission of preliminary messages about said advertisements scheduled for transmission, each message specifying content of an advertisement and its access data including a time of transmission;

a network for two-way addressable data communication;

a receiver of preliminary messages at a site on said network coupled to said one-way nonaddressable communication medium in such a way as to receive preliminary messages about said advertisements scheduled for transmission;

a receiver of advertisements at the same site on said network coupled to said one-way nonaddressable communication medium;

a server computer at the same site on said network storing data of a group of recipients determining interests of each recipient in certain products and services, said server computer being connected to said receiver of preliminary messages for comparing recipients' data with data included in preliminary messages, selecting each advertisement whose content matches interests of at least one recipient, assigning said advertisement to all interested recipients and storing access data of said selected advertisements; said server computer further being connected to said receiver of advertisements for providing reception and recording of each selected advertisement at the time of its transmission as determined by said access data; and a computer at a recipient's site having access to said server computer via said network for viewing recorded advertisements assigned to the recipient.

5. A system of claim 4; and further comprising means enabling, at a recipient's request, to automatically compose orders for products and services presented by said selected advertisements using recipient's name and address included in recipient's data, and send said orders via said network using advertisers' network addresses included in data of advertisements.

6. A system of claim 4; and further comprising means enabling, at a recipient's request, to automatically link a recipient to advertisers' network sites using advertisers's network addresses included in data of advertisements, and to automatically compose orders for products and services presented at those sites using a recipient's name and address included in recipient's data.

7. A system for electronic delivery of info products such as newspapers, magazines, books, music, video and computer software to authorized recipients only, comprising:

a one-way nonaddressable communication medium;

a transmitter at a distribution center connected to said one-way nonaddressable communication medium for transmission of a file carrying a product;

a network for addressable communication between said distribution center and recipients' sites;

authorization means at said distribution center connected to said network for sending an authorization message to said recipients' sites using network addresses of recipients to be authorized for reception of said product, said message being sent prior to transmission of said file carrying said product and containing access data of the file including a time of its transmission;

a network interface device coupled to said network at a recipient's site for reception of said authorization message;

a receiver coupled at the recipient's site to said one-way nonaddressable communication medium for reception of said file carrying said product;

a recorder connected to said receiver; and control means coupled to said network interface device for obtaining access data included in said authorization message, and coupled to said receiver and said recorder for providing reception and recording of said file carrying said product at the time of its transmission as determined by said access data.

* * * * *